US009168604B2

(12) United States Patent
Kressmann et al.

(10) Patent No.: US 9,168,604 B2
(45) Date of Patent: Oct. 27, 2015

(54) DEVICE AND METHOD FOR THERMALLY TREATING WORKPIECES IN PARTICULAR BY CONVECTIVE HEAT TRANSFER

(75) Inventors: Richard Kressmann, Zell (DE); Michael Schäfer, Külsheim (DE); Johannes Stahl, Wertheim (DE); Christoph Wolpert, Külsheim (DE)

(73) Assignee: ERSA GmbH, Wertheim (DE)

( * ) Notice: Subject to any disclaimer, the term of this patent is extended or adjusted under 35 U.S.C. 154(b) by 1039 days.

(21) Appl. No.: 12/989,528

(22) PCT Filed: Jan. 30, 2009

(86) PCT No.: PCT/DE2009/000124
§ 371 (c)(1),
(2), (4) Date: Oct. 25, 2010

(87) PCT Pub. No.: WO2009/132607
PCT Pub. Date: May 11, 2009

(65) Prior Publication Data
US 2011/0039219 A1 Feb. 17, 2011

(30) Foreign Application Priority Data

Apr. 28, 2008 (DE) .......................... 10 2008 021 240

(51) Int. Cl.
*F27D 15/02* (2006.01)
*H05K 3/34* (2006.01)
(Continued)

(52) U.S. Cl.
CPC ...................................... *B23K 1/008* (2013.01)

(58) Field of Classification Search
None
See application file for complete search history.

(56) References Cited

U.S. PATENT DOCUMENTS 2,492,220 A * 12/1949 Hasselhorn ..................... 432/48
5,125,948 A *  6/1992 Vanaschen et al. .............. 65/348
(Continued)

FOREIGN PATENT DOCUMENTS

CN 1323508 A 11/2001
CN 1387468 A 12/2002
(Continued)

OTHER PUBLICATIONS

"PCT International Preliminary Report on Patentability (English Translation) dated Nov. 18, 2010 for PCT/DE2009/000124, from which the instant application is based," 6 pgs.
(Continued)

*Primary Examiner* — Gregory Huson
*Assistant Examiner* — Eric Gorman
(74) *Attorney, Agent, or Firm* — Fredrikson & Byron, P.A.

(57) ABSTRACT

The present invention relates to a device for thermally treating workpieces that are equipped with electrical and electronic components, including at least one process chamber in which at least one heating or cooling zone is formed or disposed, wherein a temperature-controlled gaseous fluid can be introduced into said heating or cooling zone, wherein the workpieces pass through the heating or cooling zone and heat is transferred in a convective manner between the workpieces and the temperature-controlled fluid, and including at least one temperature measuring element disposed in the process chamber, wherein at least one sensor element that has a defined mass is disposed in the process chamber, such that heat is convectively transferred between the sensor element and the fluid, and an apparatus is provided for cooling and/or heating the sensor element, wherein the temperature of the sensor element can be measured by the temperature measuring element.

12 Claims, 4 Drawing Sheets

(51) Int. Cl.
*B23K 1/008* (2006.01)
*B23K 3/00* (2006.01)
*H05K 7/20* (2006.01)
*B21D 5/02* (2006.01)
*B23K 1/00* (2006.01)
*B23K 1/012* (2006.01)
*B23K 3/04* (2006.01)
*B23K 31/02* (2006.01)
*F27B 9/30* (2006.01)
*F27B 9/40* (2006.01)
*F27D 19/00* (2006.01)
*F27D 21/00* (2006.01)
*G01K 7/02* (2006.01)
*H04L 9/32* (2006.01)

(56) References Cited

U.S. PATENT DOCUMENTS

| | | | |
|---|---|---|---|
| 5,159,957 A * | 11/1992 | Hehl | 137/883 |
| 5,232,145 A * | 8/1993 | Alley et al. | 228/102 |
| 5,271,230 A * | 12/1993 | Spiess | 62/3.6 |
| 5,273,585 A * | 12/1993 | Shoga et al. | 118/719 |
| 5,345,061 A * | 9/1994 | Chanasyk et al. | 219/388 |
| 5,405,074 A * | 4/1995 | Den Dopper et al. | 228/42 |
| 5,440,101 A * | 8/1995 | Cox et al. | 219/388 |
| 5,573,688 A * | 11/1996 | Chanasyk et al. | 219/388 |
| 5,577,658 A * | 11/1996 | Bailey et al. | 228/222 |
| 5,678,323 A * | 10/1997 | Domingue et al. | 34/266 |
| 5,737,851 A * | 4/1998 | Novak et al. | 34/420 |
| 5,861,609 A * | 1/1999 | Kaltenbrunner et al. | 219/390 |
| 5,974,688 A * | 11/1999 | Domingue et al. | 34/269 |
| 6,015,966 A * | 1/2000 | Rehm | 219/388 |
| 6,145,734 A * | 11/2000 | Taniguchi et al. | 228/180.22 |
| 6,293,788 B1 * | 9/2001 | Novak et al. | 432/175 |
| 6,375,351 B1 * | 4/2002 | Breunsbach et al. | 374/142 |
| 6,402,011 B1 * | 6/2002 | Taniguchi et al. | 228/180.1 |
| 6,450,803 B2 * | 9/2002 | Shirakawa et al. | 432/77 |
| 6,484,926 B2 * | 11/2002 | Bell | 228/234.2 |
| 6,600,137 B1 | 7/2003 | Nonomura et al. | |
| 6,796,483 B1 | 9/2004 | Weber et al. | |
| 2002/0053588 A1 * | 5/2002 | Taniguchi et al. | 228/39 |
| 2002/0130278 A1 * | 9/2002 | Vella | 250/492.21 |
| 2002/0146657 A1 * | 10/2002 | Anderson et al. | 432/11 |
| 2004/0174922 A1 * | 9/2004 | Yamashita et al. | 374/131 |
| 2006/0120703 A1 * | 6/2006 | Tanaka et al. | 392/465 |
| 2006/0162363 A1 * | 7/2006 | Sharma et al. | 62/259.2 |
| 2007/0042310 A1 * | 2/2007 | Clark et al. | 432/77 |
| 2013/0240115 A1 * | 9/2013 | Horng | 156/64 |

FOREIGN PATENT DOCUMENTS

| | | | | |
|---|---|---|---|---|
| JP | 10145037 A | * | 5/1998 | H05K 3/34 |
| JP | 2001504392 A | | 4/2001 | |
| JP | 2003031940 A | * | 1/2003 | H05K 3/34 |
| JP | 2003071562 A | * | 3/2003 | B23K 1/008 |
| WO | 9700752 A | | 1/1997 | |

OTHER PUBLICATIONS

"Office Action and Search Report, including English translation, dated Dec. 5, 2012 for related Chinese Application No. 200980114848.4," 18 pgs.

Office Action dated May 23, 2012, with English translation, in corresponding Japanese patent application, 7 pgs.

Office Action dated Sep. 20, 2012, with English translation, in corresponding Korean patent application, 7 pgs.

"PCT International Search Report dated Jul. 23, 2009 for PCT/DE2009/000124, from which the instant application is based," 4 pgs.

* cited by examiner

DEVICE AND METHOD FOR THERMALLY TREATING WORKPIECES IN PARTICULAR BY CONVECTIVE HEAT TRANSFER

RELATED APPLICATIONS

This application is a US 371 national stage entry of International Application No. PCT/DE2009/000124, filed Jan. 30, 2009, which claims priority to German Patent Application No. 10 2008 021 240.7, filed Apr. 28, 2008, the teachings of which are incorporated herein by reference.

The present invention relates to a device according to the preamble of claim 1. Devices or systems for thermally treating workpieces, in particular printed circuit boards or the like serve for the thermal treatment of all types of workpieces, for instance for curing of adhesive connections, thermal conditioning for downstream working stations or the like. In particular, such devices serve as soldering devices or soldering systems, in particular reflow soldering systems, for printed circuit boards or other carriers that are equipped with electrical or electronic components.

In this regard, the reflow soldering systems known from the state of the art regularly feature several successively arranged process chambers or process zones of different temperatures, in particular a preheating zone, a reflow zone and a cooling zone, in which the printed circuit boards to be soldered are subjected to different temperatures. The heating process in each zone is performed with the aid of heating and cooling elements, the heat thereof being conveyed in the direction of the printed circuit boards using blowers. In this process, heat is blown to the printed circuit boards in general from above and from below. The heat transfer to the printed circuit boards is substantially performed in a convective manner and is in particular contingent upon the temperature and the flow conditions prevailing in the heated air.

In order to realize a sufficient degree of process stability and thus reliability and in particular reproducible soldering results, the detection of the process parameters for controlling and adjusting the device is of essential relevance. While this can be attained in a comparatively easy manner for the temperature in the process chamber or process zone, the convection conditions, such as flow conditions, are hard to detect, in particular since known flowmeters or anemometers cannot be utilized in process chambers of such high temperatures as are encountered in reflow soldering processes.

Starting from this state of the art, it is one of the objects of the embodiments of the present invention to suggest a device for thermally treating workpieces and which makes it possible to detect the process stability in the process chambers or process zones, respectively.

The embodiments of the inventive device or system for thermally treating workpieces, in particular printed circuit boards or the like that are equipped with electrical and electronic components, in a manner known per se comprises at least one process chamber in which at least one cooling or heating zone is formed or disposed, a temperature-controlled gaseous fluid being introducible therein. In this regard, the fluid may be atmospheric air, a protective gas or any other optional type of gas or gaseous mixture. The workpieces to be treated in this process pass through the heating or cooling zone, wherein heat is transferred in particular in a convective manner between the workpieces and the temperature-controlled fluid. In the process chamber, at least one temperature measuring element is additionally provided.

According to an embodiment of the invention, at least one sensor element that has a defined mass is provided and disposed in the process chamber, such that heat is convectively transferred between the sensor element and the fluid. In addition, according to an embodiment of the invention, provision is made for an apparatus by means of which the sensor element can be cooled and/or heated relative to the temperature prevailing in the process chamber. The temperature of the sensor element can be measured by the temperature measuring element.

Firstly, the arrangement of the sensor element that has a defined mass in the process chamber means that the sensor element is subjected to a convective heat transfer in the same way as the workpieces to be treated. In this process, the sensor element is heated until it substantially assumes the temperature prevailing within the process chamber. Upon reaching this first equilibrium state, the sensor element is cooled by means of the apparatus until a second equilibrium state at a lower temperature level is reached or a sufficiently low temperature of the sensor element is attained. Subsequently, cooling of the sensor element is terminated and the sensor element is convectively heated to once again reach the first equilibrium state. On the basis of the temperature profile of the temperature of the sensor element, in particular the increase of the temperature upon termination of the cooling process, conclusions can be drawn as to the convection. In other words, this means that the faster the temperature increase, the better the convection. By performing a comparison of the temperature curves of successive cooling and heating cycles of the sensor element, or of the respectively current temperature curve with a reference curve, conclusions as to the convection within the process chamber can thus be drawn. In particular, it can be established if the convection remains stable or is changing in the course of the process.

Alternatively to the cooling of the sensor element, the sensor element can also be heated with the aid of the apparatus until a second equilibrium state of a higher temperature or a sufficiently high temperature of the sensor element is reached, whereupon the sensor element is convectively cooled until reaching the first equilibrium state. On the basis of the temperature profile of the temperature of the sensor element, in particular the decrease of the temperature upon termination of the heating process, conclusions can be drawn as to the convection. In other words, this means that the faster the cooling of the sensor element, the better the convection.

The way in which the temperature measuring element is arranged is basically arbitrary, provided that a sufficiently accurate measurement of the temperature of the sensor element is guaranteed. According to a preferred exemplary embodiment of the invention, the temperature measuring element is directly or indirectly disposed at or within the sensor element.

For instance, the temperature measuring element can be disposed on the surface of the sensor element, for example in an adhesively bonded fashion. However, according to an exemplary embodiment of the invention, the sensor element features a recess having the temperature measuring element disposed therein. This recess, for instance, may be an indentation on the surface or else a bore provided in the body of the sensor element.

The type of the temperature measuring element is basically optional. Thus, thermo-sensors of any optional type can be employed, for instance thermo elements, semiconductor sensors, electrical resistance sensors or the like.

The number and arrangement of the sensor elements are likewise basically optional and are essentially contingent upon the number, arrangement and design of the process chambers. Preferably, however, at least one sensor element is disposed in each process chamber.

If the process chamber or the plurality of process chambers each feature several heating and/or cooling zones, according to another preferred exemplary embodiment of the invention, at least one sensor element is disposed in each heating or cooling zone of each process chamber. In this way, process stability can be determined for each temperature zone of each process chamber.

The cooling of the sensor element via the cooling apparatus can be performed in a basically arbitrary fashion. Thus, a liquid or gaseous coolant may be sprayed onto or else flushed around, for instance, the sensor element. Preferably, however, the coolant employed is compressed air that can be directly or indirectly conducted to the sensor element via at least one tube section of the cooling apparatus. In a basically identical fashion, the sensor element can be heated, for instance, by conducting a hot fluid, in particular a heating gas, through the sensor element.

According to a preferred exemplary embodiment of the invention, the sensor element features an essentially continuous recess which is penetrated by the tube section through which the coolant or the heating agent is conducted. By means of this measure, the coolant or the heating agent can be easily conducted to the sensor element and can cool or heat the sensor element.

According to another exemplary embodiment, the sensor element may have an essentially sleeve-like shape and may connect two tube sections provided for the cooling or heating fluid in a substantially fluid-tight manner. In this embodiment, the sensor element as such constitutes a part of the coolant or heating agent conduit, thereby enabling in particular good thermal transfer between sensor element and coolant or heating agent and thus rapid cooling or rapid heating of the sensor element can be realized.

The connection of the tube sections to the sensor element can be performed by any optional force-fitting or form-fitting connection process, for instance by adhesive bonding, welding, press-fitting or the like. Preferably, the tube sections to be connected, however, are each equipped at their axial ends with an external thread and the sleeve-like sensor element at its collar side features internal threads being complementary in shape and function to the external threads. Thus, the tube sections can be connected to one another in a simple manner in the type of known tube sleeve threaded connections.

It is desirable that the temperature prevailing in the process chamber or the process zone of the process chamber is influenced to the lowest possible extent by the cooling or heating of the sensor element. To this end, it is advantageous if the coolant and, in particular, the compressed air used as a coolant or the heating agent is conducted through the process chamber in a substantially closed cycle and does not enter the atmosphere of the process chamber. According to a particularly preferred exemplary embodiment of the invention, all sensor elements are thus connected to one another by means of the tube sections while forming a cooling or heating system substantially closed with respect to the process chamber.

A particularly reliable and accurate measurement of the temperature of the sensor element can be obtained if, according to another preferred exemplary embodiment of the invention, the temperature measuring element is disposed in the cladding of the sleeve-shaped sensor element, in particular in a bore which essentially extends in parallel to the longitudinal axis of the sleeve.

Moreover, the invention relates to a method for determining the thermal process stability in a device for thermally treating workpieces, in particular printed circuit boards or the like that are equipped with electrical or electronic components. In this process, the workpieces pass through at least one process chamber in which at least one heating or cooling zone is formed or disposed, a temperature-controlled gaseous fluid being introducible therein. In this regard, at least one sensor element that has a defined mass is disposed in the process chamber. Moreover, heat is convectively transferred between the workpieces and the temperature-controlled fluid. The embodiments of the inventive method include the following method steps:

Firstly, the sensor element is convectively heated in the atmosphere of the process chamber until an equilibrium state is reached, in which the sensor element substantially has the temperature of the atmosphere within the process chamber.

Subsequently, repeated cooling and heating of the sensor element is performed, wherein the cooling is performed at a substantially unchanged temperature of the process chamber and the heating is performed by convection in the atmosphere of the process chamber or, alternatively, the heating is performed at a substantially unchanged temperature of the process chamber and the cooling is performed by convection in the atmosphere of the process chamber.

Subsequently, the temperature curves of the sensor element derived from successive heating and cooling cycles are compared or the current temperature curve is compared with a reference curve.

In this context, in particular on the basis of the change of temperature of the sensor element, a conclusion can be drawn as to the process stability in the process chamber. If, for instance, the temperature of the sensor element increases in successive heating or cooling cycles in an identical manner, i.e. in particular at the same rate, sufficient process stability is ensured. If the temperature in subsequent cycles increases for instance at a slower rate, convection is deteriorated. By means of detecting such temperature cycles, it is thus easily possible to obtain an indirect conclusion as to the convection.

In the following, the embodiments of the invention will be described in more detail with reference to the drawings illustrating only one exemplary embodiment.

Figure 1:
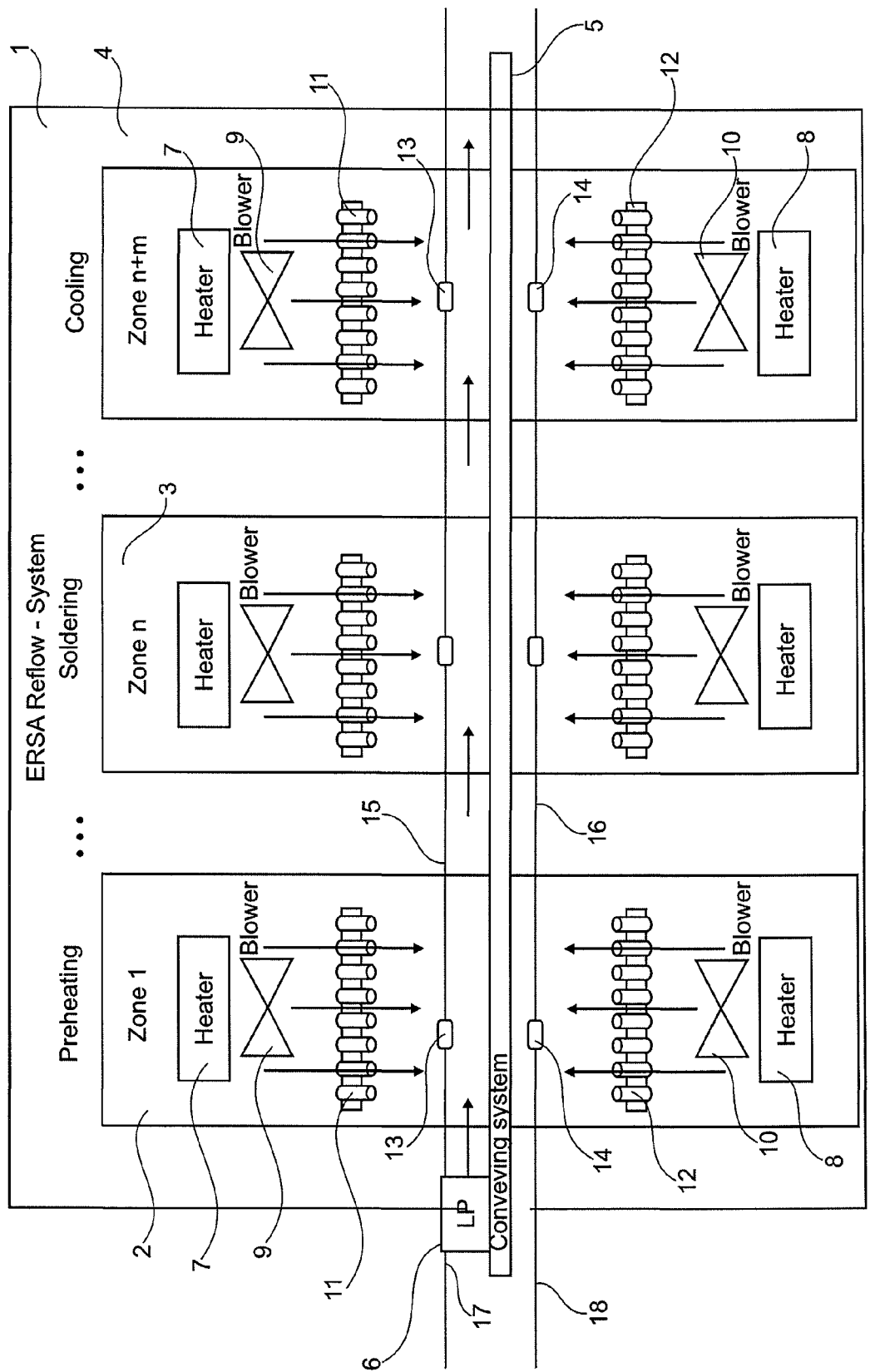
FIG. 1 shows an inventive reflow soldering system in a schematic view in the type of a block-diagram.

The reflow soldering system illustrated in FIG. 1 has a process chamber 1 comprising a plurality of process zones, wherein only three process zones thereof, i.e. a preheating zone 2, a soldering zone 3 and a cooling zone 4, are illustrated. The process zones are separated from one another by separating devices (not illustrated here), for instance partition walls or the like, such that temperature equalization between the process zones is prevented.

The printed circuit boards 6 to be soldered are conveyed through the device on a conveying device in the form of a conveyor belt or conveyor chain device 5 in such a manner that the process chambers 2 to 4 are successively passed.

Each process zone respectively features a heating device 7, 8 above and below the conveying device, by means of which the atmosphere prevailing in the process zone is heated. With the aid of blowers 9, 10, the thus heated process fluid, for instance air or a protective gas, is blown onto the printed circuit boards 6 using distribution nozzles 11, 12, resulting in that the printed circuit boards are heated or cooled, wherein at least in the process zone 3 in the region of the printed circuit boards 6, a temperature prevails that is at least slightly higher than the melting temperature of the utilized solder. The heat transfer from the process fluid to the printed circuit boards in this context is substantially performed through convection.

In the region between the upper heating device 7 and the conveying device 5 or the lower heating device 8 and the conveying device 5, respectively, in each process zone 2, 3 and 4 one sensor element 13 and 14 is respectively arranged. The upper sensor elements 13 and the lower sensor elements 14 are each connected via tube sections 15 and 16 through which, where required, compressed air is conducted through the sensor elements. At both ends of the device, the tube sections are led towards the outside and are connected to a compressed air source (not illustrated here) at least in the inlet area 17, 18 of the preheating zone 2.

Figure 2:
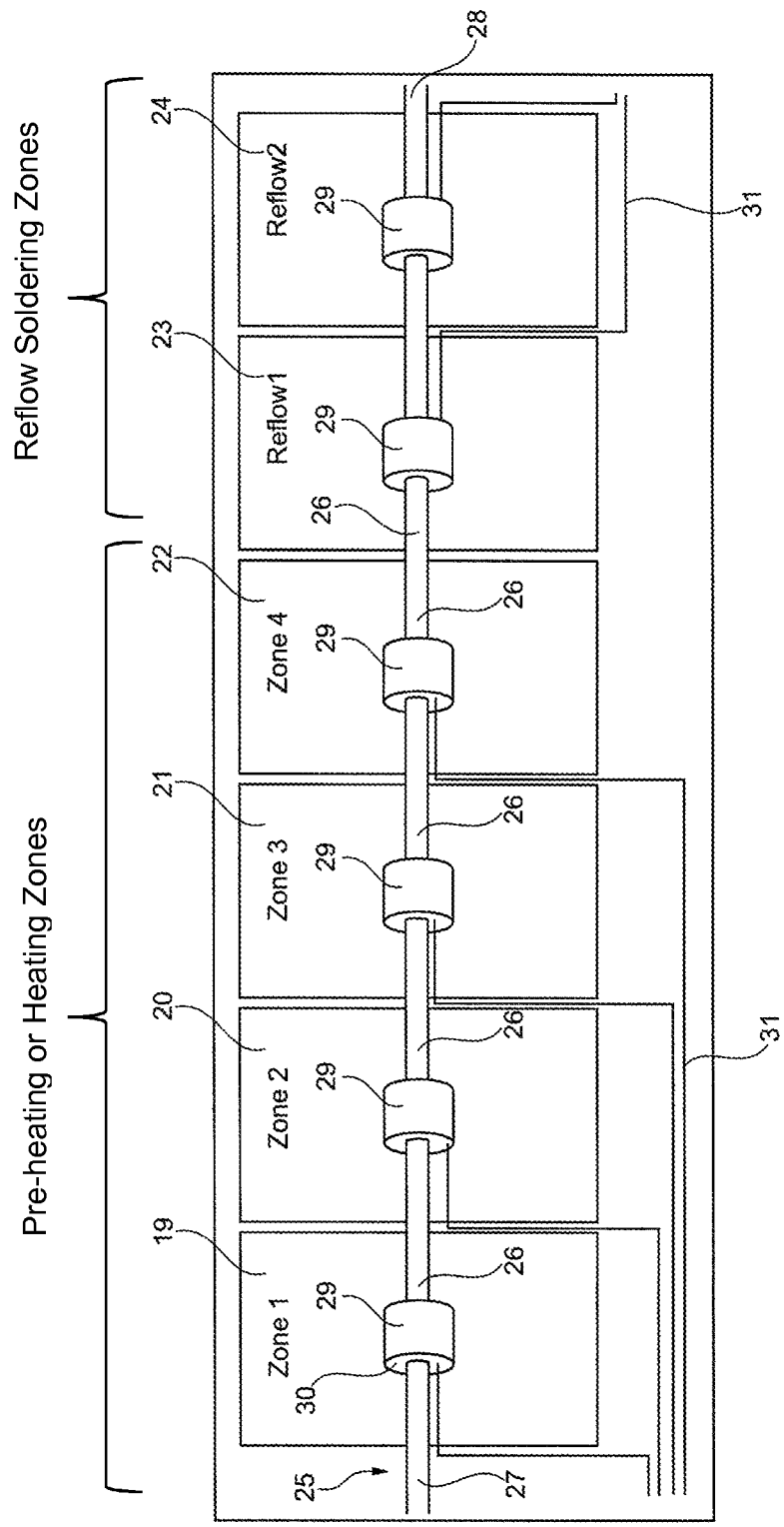
FIG. 2 shows an inventive sensor element arrangement in a reflow soldering system similar to FIG. 1 comprising six process zones in an enlarged view.

FIG. 2 illustrates a sensor arrangement in a device comprising six process zones. The process zones 19 to 22 are here constituted by preheating zones or heating zones and correspond to process zone 2 of FIG. 1. The process zones 23 and 24 constitute reflow soldering zones and in this regard correspond to process zone 3 of FIG. 1. Moreover, provision is made for a tube 25 composed of the tube sections 26 and the tube inlet section 27 as well as the tube outlet section 28. The tube inlet section is connected to a compressed air source (not illustrated here).

In each process zone, provision is made for a sensor element 29. The sensor elements 29 are configured as a sleeve-like hollow cylinder having the shape of a tube section. Here, each sensor element 29, in the region of both collar-sided ends thereof, is equipped with an internal thread (not illustrated here) into which the frontal-sided ends of the tube sections 26, 27 and 28, which have a complementary external thread, are screwed. In this manner, a fluid-tight tube system being screwed together by means of the sleeve-like sensor elements is obtained, through which compressed air for cooling the sensor elements can be conducted.

In the region of the frontal sides 30, the sensor elements 29 are equipped with a bore (not illustrated here) being formed in the cladding of the sensor element substantially in parallel to the longitudinal axis of the sleeve. In this bore, one temperature measuring element is respectively disposed that serves for detecting the temperature of the sensor element. The temperature measuring element, which is not illustrated, is equipped with a measuring and evaluation unit (not illustrated in FIG. 1) provided for the signal of the temperature measuring element via an electrical line 31. The temperature measuring element and the electrical line 31 are identically formed in all sensor elements.

Figure 3:
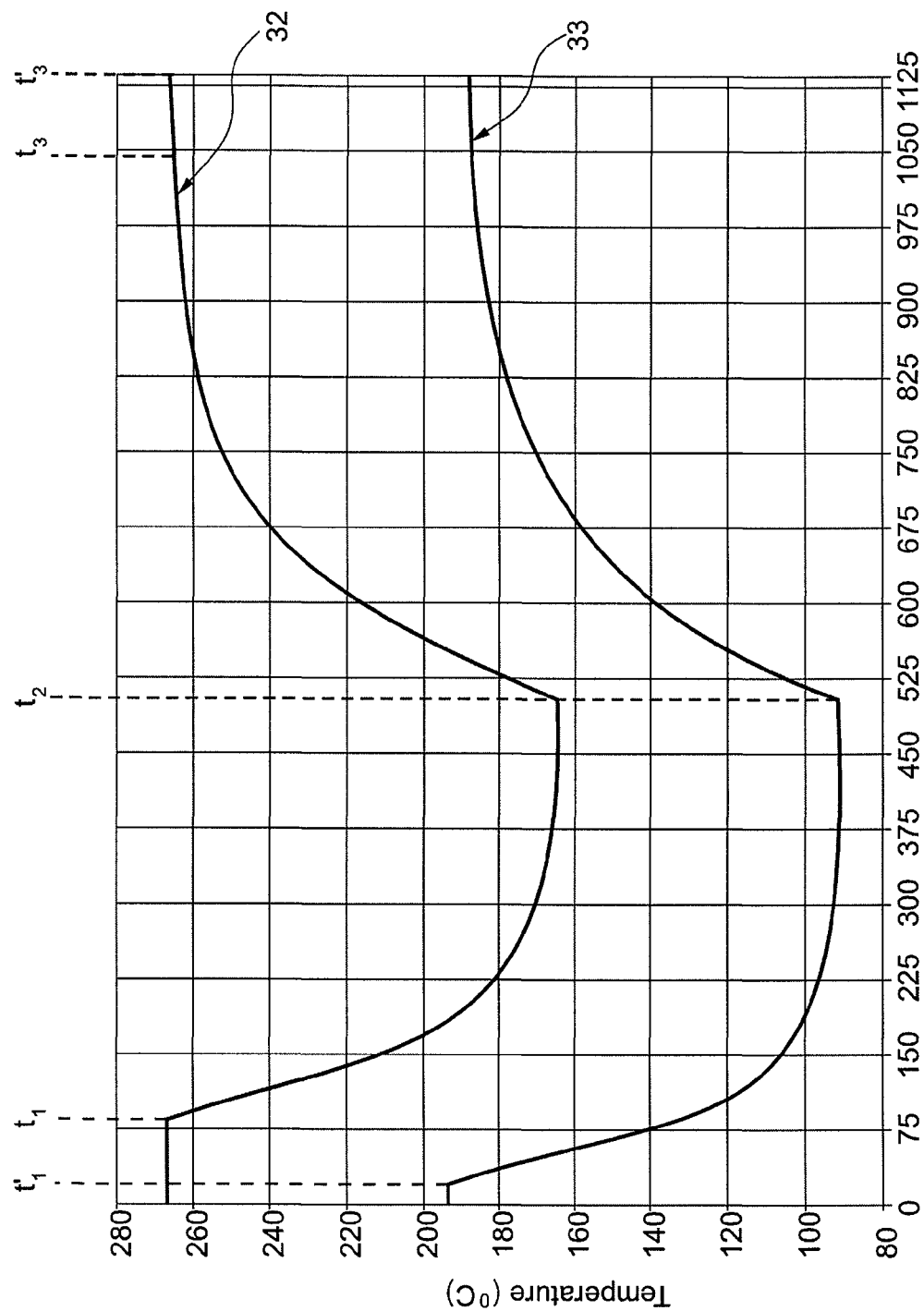
FIG. 3 shows a temperature-time diagram of successive heating and cooling cycles of a sensor element.

The temperature profile of a sensor element will be described hereinafter by means of the upper curve 32 of the diagram according to FIG. 3:

At the point of time $t_1$, the sensor element 29 has a temperature that corresponds to the process temperature in the respective process zone. An equilibrium state prevails. Starting from the point of time $t_1$, the sensor element is cooled by means of compressed air which is blown through the tube sections and the sensor element until at the point of time $t_2$, once again an equilibrium state is reached, in which the sensor element has reached its lowest temperature or a sufficiently low temperature of the sensor element is attained. The atmospheric temperature in the process zone, however, remains basically unchanged, since on the one hand the compressed air does not enter the process atmosphere and on the other hand, the cooled masses of the tube sections and sensor elements are relatively small in comparison to the size of the process zone.

At the point of time $t_2$, the supply of compressed air is stopped and the sensor element is convectively heated until at the point of time $t_3$, in turn, the equilibrium state prevailing at the point of time $t_1$ is reached again.

The cooling and reheating of the sensor element, as described above, is now repeated for an arbitrary number of times during operation of the process zone. In the diagram according to FIG. 3, with the aid of curve 33, the temperature profile of the same sensor element is illustrated in a subsequent cooling and heating cycle. For the purpose of simplified representation, the curve 33 is illustrated in a downwardly offset fashion with respect to curve 32. In reality, the absolute temperatures in the region of the equilibrium states at the points of time $t_1$ or $t_2$ and $t_3$ or $t_3'$ of the two diagram profiles are identical. When the temperature increase of the two curves 32, 33 caused by the convection subsequent to the point of time $t_2$ is now compared, it is evident that the slope of curve 33 is clearly shallower than the slope of curve 32. In other words, this means that the convective heat transfer in the cycle on which curve 33 is based, is worse than the convective heat transfer in the preceding cycle of curve 32. Thus, a change of the convection and thus process instability can be easily detected.

Figure 4:
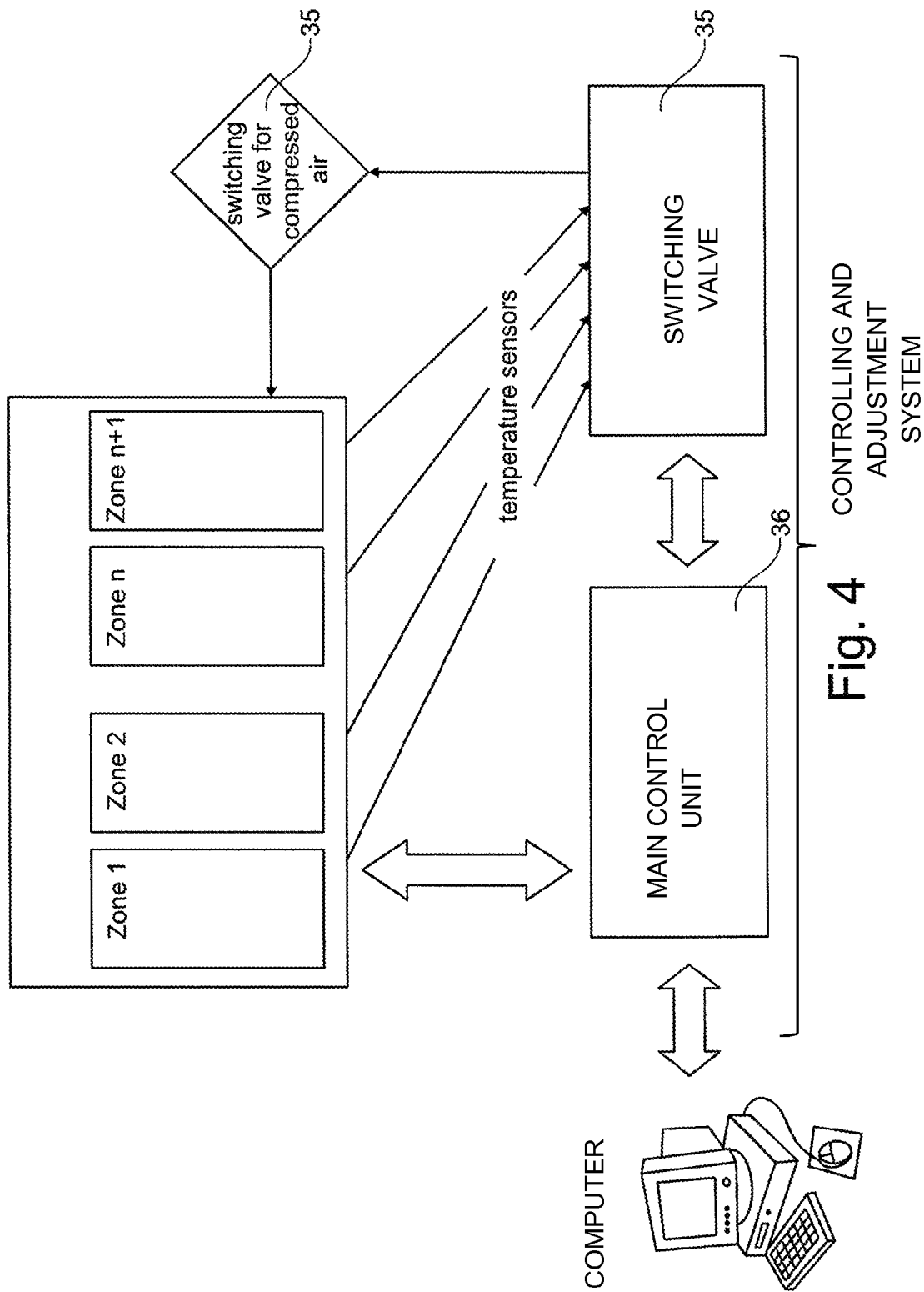
FIG. 4 shows a controlling and adjustment system of an inventive device in a schematic view in the type of a block diagram.

As is apparent in particular from FIG. 4, the signals of the sensor elements of the different process zones of an inventive device are supplied to an evaluation or control unit 34 and are processed there as described above. With the aid of this evaluation and control unit, in addition, periodical activation and deactivation of a switching valve 35 for supplying compressed air is performed by means of which the periodical cooling process of the sensor elements is initiated and terminated.

The result of the comparison of the temperature profiles of successive heating and cooling cycles of the sensor elements is supplied to a main control unit 36 which, as a function of the determined different temperature profiles, regulates for instance the heater and/or blower of the respective process zones or else the throughput rate of the conveying device for the printed circuit boards.

The invention claimed is:

1. A device for thermally treating workpieces, in particular printed circuit boards or the like that are equipped with electrical and electronic components, comprising
   at least one process chamber in which at least one heating or cooling zone is formed or disposed, wherein
   a temperature-controlled gaseous fluid, which is heated by a heating device, can be introduced into the heating or cooling zone,
   wherein the workpieces pass through the heating or cooling zone and heat is transferred particularly in a convective manner between the workpieces and the temperature-controlled fluid, and
   comprising at least one temperature measuring element disposed in the process chamber,
   comprising at least one sensor element that has a defined mass and is disposed in the process chamber, such that heat is convectively transferred between the sensor element and the fluid, and
   an apparatus provided for cooling or heating the sensor element, the apparatus being separate and distinct from the heating device, wherein
   the temperature of the sensor element can be measured by the temperature measuring element.

2. The device according to claim 1, wherein the temperature measuring element is disposed within or on the sensor element.

3. The device according to claim 2, wherein the sensor element comprises a recess having the temperature measuring element disposed therein.

4. The device according to claim 1 wherein, the temperature measuring element is a thermo-sensor.

5. The device according to claim 1 wherein, at least one sensor element is disposed in each process chamber.

6. The device according to claim 1 wherein, at least one sensor element is disposed in each heating or cooling zone of each process chamber.

7. The device according to claim 1 wherein, the apparatus for cooling or heating the sensor element features at least one tube section through which a cooling fluid, in particular in the form of compressed air, and a heating fluid can be directly or indirectly conducted to the sensor element.

8. The device according to claim 7, wherein the sensor element features an essentially continuous recess which is penetrated by the tube section.

9. The device according to claim 7, wherein the sensor element has an essentially sleeve-like shape and couples two tube sections provided for the cooling fluid and the heating fluid in a substantially fluid-tight manner.

10. The device according to claim 9, wherein the tube sections to be coupled are each equipped with an external thread at their axial ends and the sleeve-like sensor element at its collar side is equipped with internal threads being complementary in shape and function to the external threads.

11. The device according to claim 7 wherein, all sensor elements are coupled to one another by the tube sections while forming a cooling and heating system substantially closed with respect to the process chamber.

12. The device according to claim 7 wherein, the temperature measuring element is disposed in a cladding of the sensor element, in particular in a bore which essentially extends in parallel to a longitudinal axis of the sensor element, and the sensor element has an essentially sleeve-like shape.

* * * * *